United States Patent [19]

Torii et al.

[11] Patent Number: 4,609,956
[45] Date of Patent: Sep. 2, 1986

[54] MAGNETIC DRUM CASSETTE WITH MAGNETIC DRUM HAVING VOICE INFORMATION RECORDED THEREON

[75] Inventors: Michihiro Torii, Hamamatsu; Takao Moritomo, Shizuoka; Kaoru Endo, Shizuoka; Norifumi Ito, Shizuoka, all of Japan

[73] Assignee: Fuji Electrochemical Co., Ltd., Tokyo, Japan

[21] Appl. No.: 527,497

[22] Filed: Aug. 29, 1983

[30] Foreign Application Priority Data

Sep. 2, 1982 [JP] Japan .......................... 57-133743[U]
Apr. 1, 1983 [JP] Japan .......................... 58-48345[U]

[51] Int. Cl.$^4$ .................. G11B 5/004; G11B 5/55; G11B 21/08; G11B 5/10
[52] U.S. Cl. .................................. 360/100; 360/106; 360/128
[58] Field of Search ............... 360/72.1, 87, 100, 106, 360/128, 136, 12, 133, 109

[56] References Cited

U.S. PATENT DOCUMENTS

| 3,482,060 | 12/1969 | Dermond | 360/100 |
| 3,618,120 | 11/1971 | Hanbicki | 360/100 |
| 4,225,893 | 9/1980 | Loiselle | 360/128 |
| 4,333,116 | 6/1982 | Schoettle et al. | 360/106 |
| 4,376,961 | 3/1983 | Torii et al. | 360/106 |
| 4,422,112 | 12/1983 | Tanaka | 360/109 |
| 4,439,792 | 3/1984 | van de Bult | 360/106 |
| 4,445,157 | 4/1984 | Takahashi | 360/133 |

Primary Examiner—Robert S. Tupper
Assistant Examiner—Melissa J. Koval
Attorney, Agent, or Firm—Fleit, Jacobson, Cohn & Price

[57] ABSTRACT

A magnetic drum and parts ancillary thereto are enclosed in a housing consisting of an upper casing and a lower casing to form a cassette-type magnetic drum unit for voice information system. The magnetic drum cassette is releasable from the system which includes a magnetic head for reproducing the voice information stored in the magnetic drum.

5 Claims, 7 Drawing Figures

MAGNETIC DRUM CASSETTE WITH MAGNETIC DRUM HAVING VOICE INFORMATION RECORDED THEREON

BACKGROUND OF THE INVENTION

The present invention relates in general to a magnetic drum head system for selectively generating recorded voice information, or an automatic message announcement system, and more particularly to a magnetic drum unit for a voice generation or announcement system, which is used, for example, in a device for reproducing a warning sound or reproducing a voice. The system is used in vehicle, or vending machines.

In announcing systems such as automobile status monirots, vending machines, various terminal equipment, elevators, loudspeaker equipment and the like, it has been recently proposed that the employment of a magnetic drum system may lead to a useful result. In these uses the requirements are such that audio signals (analog signals) can be recorded and reproduced directly and that a plurality of messages can be accessed at random. A system is available satisfying these requirements by dividing a recording medium layer on the surface of a magnetic drum into a plurality of tracks and recording and reproducing information (messages) on each track by a magnetic head.

A magnetic drum/head system for the voice information is described in U.S. Pat. No. 4,376,961, assigned to the present assignee.

The present invention affords a magnetic drum mechanism which if formed and packaged into a cassette, which is releasably mounted to a magnetic head mechanism of a voice information system.

In a known magnetic drum system as is applied in various fields of art in which an information track or channel is searched while the magnetic drum is being rotated at a relatively high speed, the magnetic head approaches the selected track of the drum by way of the other unselected tracks with the magnetic head being in contact with the magnetic drum.

In the various fields to which the magnetic drum system is applied, it is necessary that the drum system be miniaturized, lightweight and be highly durable. In order to miniaturize a magnetic drum, it is necessary to decrease the circumferential speed or rim speed of the drum while a predetermined output level is obtained by pressing the magnetic head onto the surface of the magnetic drum since the lower rim speed results in a decrease of an output level. However, when the magnetic head is pressed with a stronger force than usual against the magnetic drum, it is likely that the magnetic head and drum are rapidly worn out due to an unnecessary frictional contact between the drum, rotating at a high speed, and the magnetic head. Further, such an undesirable frictional resistance increases wow/flutter, and consequently, the desired reproduction of the recorded information is not obtained.

In many cases, it is desired or necessary that recorded information i.e., the message, be changeable such that other information can be recorded and played back from the drum. In the conventional system, the system with the magnetic drum mounted therein is sealed, and therefore it is impossible or quite difficult to access to the magnetic drum after the drum is assembled into the system. A reason for this is to prevent foreign particles from adhering to the magnetic drum so as to avoid failure of desired reproduction of voice information and consequent decrease of reliability of the operation of the drum. Particularly when oil such as silicone oil is coated on the circumference of the magnetic drum so as to eliminate a frictional resistance between the magnetic head and the magnetic drum, it is necessary to seal or fully enclose the mechanism. Another reason for sealing the mechanism of the drum is to prevent a change of properties due to long-time exposure to ultraviolet light.

Accordingly, in order to modify and change the recorded information, a troublesome rewriting operation is required in the conventional system.

SUMMARY OF THE INVENTION

An object of the present invetnion is to provide a cassettetype magnetic drum which is releasably mounted to a voice information system.

Another object of the invention is to provide an improved magnetic drum system which is encapsulated so as to avoid adhesion of foreign particles.

Another object of the present invention is to provide a magnetic drum cassette, which can be easily mounted to and released from the magnetic head system.

An additional object of the invention is to provide a magnetic drum cassette which permits access to the magnetic drum and permits a clean up of the magnetic head.

Another object of the present invention is to provide a magnetic drum cassette which can be readily exchanged by another magnetic drum having different information stored therein.

Another object of the present invention is to solve the problems that are unavoidable in the prior art, and thus provide a magnetic drum cassette which is free from the problem of dust and dirt sticking to the surface of the magnetic recording medium and damaging it, and which can be replaced easily in the field.

Briefly, the magnetic drum cassette according to the present invention has a lower casing or base plate having a bearing at its central portion, a magnetic drum rotatably mounted to the bearing of the lower casing, an upper casing adapted to the lower casing to encapsulate the drum except for the position where a magnetic head contacts the magnetic drum, and an oil coating device slidably contacted with the circumference of the magnetic drum. The magnetic drum cassette is releasably mounted on a body of the voice information system. The housing consisting of a lower casing and an upper casing is detachable from the magnetic drum unit body incorporated therein by the use of positioning guide holes formed for setting the housing at a given position on the magnetic drum unit body, a through-hole for inserting a capstan for driving the magnetic drum, and an opening through which the magnetic head contacts the magnetic drum.

In a preferred embodiment of the invention, a cover is slidably mounted on the housing to open and close the opening. The cover preferably has a head cleaner, which may be formed by a plate having a setof parallel grooves and made of a soft, flexible synthetic resins. The cover can protect the magnetic head when the magnetic drum cassette is not mounted to the system.

DETAILED DESCRIPTION OF PREFERRED EMBODIMENTS

Figure 1:
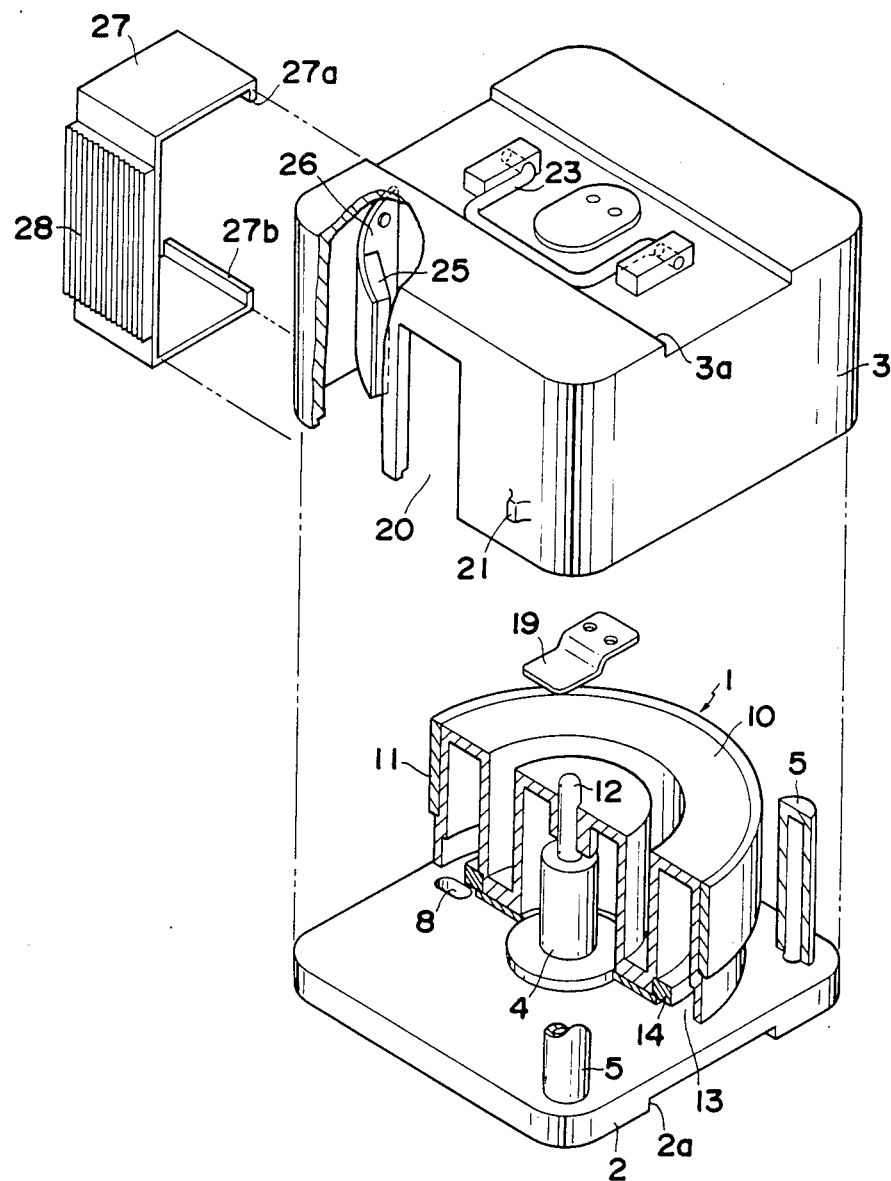
FIG. 1 is a fragmentary perspective view of a magnetic drum cassette according to the present invention.

Referring first to FIG. 1, a magnetic drum cassette has a housing which has a bottom plate or a lower casing 2 and an upper casing 3. The lower casing 2 is a rectangular plate and has a bearing 4 at the central portion for rotatably mounting a rotational shaft of a magnetic drum 1 which will be described presently. The lower casing 2 has positioning tubes 5 at the corners. In the illustrated embodiment of FIGS. 1-3, three tubes 5 are provided, for the purpose of facilitating assembly of the casing. The tubes 5 receive guide pins 6 (FIG. 2) which are formed on a seat of the system, on which the cassette is mounted in position. The lower casing 2 has a through hole 8 for receiving a capstan 15 (FIG. 2).

A magnetic drum 1 has a magnetic recording layer 11 formed on substantially entire circumferential surface of a drum body which is of metal or synthetic resin. The magnetic drum may be formed, as usual, by coating magnetic material on the circumference of a drum body 10 made of metal or synthetic resin, or by winding an elongated magnetic sheet around the drum body 10 but it is preferred that the magnetic drum 1 be constructed by forming at first, through a general extrusion method, a seamless tube composed of magnetic materials such as $\gamma$-Fe$_2$O$_3$ and rubber such as, for example, NBR, cutting the formed seamless tube into a predetermined length and then mounting forcibly the cut seamless tube around the drum body 10 against a resilient force of the seamless tube. It is preferred that the seamless magnetic tube has Shore hardness of 65–85 ("A" scale). The seamless tube which is cut to a predetermined length as described above has an inner diameter smaller than the diameter of the drum body 10 so that the seamless tube may be snugly and forcibly fitted on the drum body 10. The seamless magnetic tube can be easily formed by known methods to eliminate the problem of non-alignment or offset which inevitably occurs at the starting and terminating ends of a magnetic sheet when the magnetic sheet is wound around the drum body 10, and which must be made flush with each other by necessary surface finishing.

The thus formed magnetic drum 1 is rotatably secured by a rotary axial shaft 112 which is received in the bearing 4 of the lower casing 2. The magnetic drum 1 has, at its lower end, an annular groove or concentric recess 13 and a rubber ring 14 which is snugly and forcibly fitted to a lower inner wall of the recess 13 so that the capstan 15 (FIG. 2) extends into the recess 13 and can frictionally contact the rubber ring 14 to rotate the magnetic drum 1.

Figure 2:
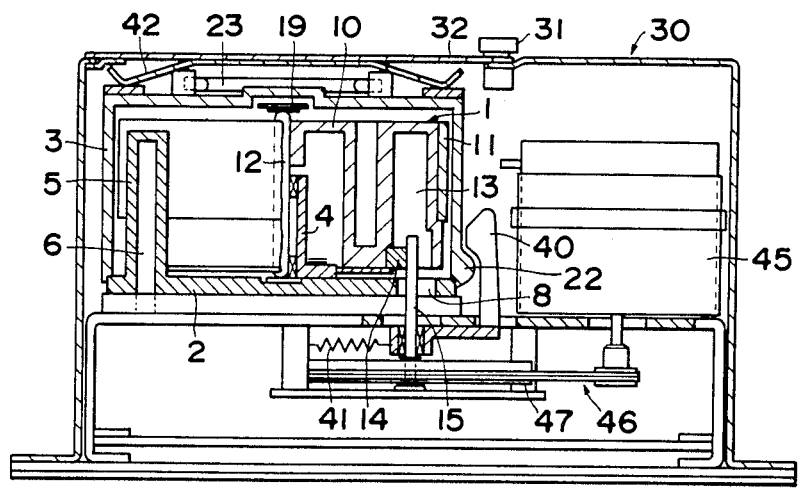
FIG. 2 is a sectional view of a magnetic drum/head voice information system in which the magnetic drum cassette is mounted.

Referring to FIGS. 1 and 2, the upper casing 3, which functions to limit an axial movement of the magnetic drum 1 and to form a substantially closed chamber in combination with the lower casing 2, has a leaf spring 19 to resiliently hold the upper end of the rotary shaft 12 of the magnetic drum 1. The upper casing 3 has an opening 20 through which the magnetic head 34 (FIG. 3) projects to contact the magnetic drum 1. Reference numerals 21 and 22 represent cams for engagement with levers 40, which will be described presently. The upper casing has a collapsible hook for releasing the cassette from the system.

An oil-impregnated pad 25, which is in slidable contact with a magnetic layer 11 of the drum, is attached to a leaf spring 26. The leaf spring 26 is fixed inside the upper casing 3. The oil-impregnated pad 25 resiliently contacts the magnetic layer 11 of the drum so that the oil is coated on the entire circumferential surface of the drum. The oil pad 25 is preferably made of materials such as felts or the like which has a desired property of containing oil such as silicone oil.

The upper and lower casings, which receive therein the magnetic drum 1 and its associated parts, are adhered together to form a cassette housing.

Figure 4:
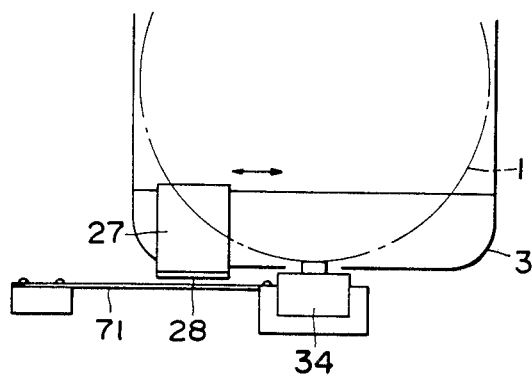
FIG. 4 is an explanatory view of the drum cassette and a magnetic head, illustrating an operation of a head cleaner/cover which is slidably mounted to the cassette casing.

Referring to FIG. 1, a cover 27 is slidably mounted to the cassette housing for opening and closing the opening 20 of the upper casing. In order to facilitate a slidable movement of the cover 27, it is preferred that shoulders 2a, 3a are formed on the upper and lower casings, and hooks 27a, 27b each projecting towards the other one of them are formed at the end of the cover 27, so that the cover is slidably secured by the combination of shoulders 2a, 3a and hooks 27a, 27b. The cover may be formed of a desired metal or synthetic resin. In the illustrated embodiment shown in FIG. 1, the cover 27 has a magnetic head cleaner 28 on the surface which opposes against the magnetic head. The cleaner 28 has a plate having a number of indentation or parallel grooves. The plate of the cleaner 28 is made of a soft material such as soft synthetic resins. If desired, the cover 27 and the cleaner 28 can be formed in a unitary structure. The cover 27 protects the inner elements such as the magnetic drum 1 when the magnetic drum cassette is not mounted to the voice information system. The cleaner 28, when slided along the shoulders 2a, 3a by a simple manipulation, can clean up easily the magnetic head 34, as illustrated in FIG. 4.

Figure 3:
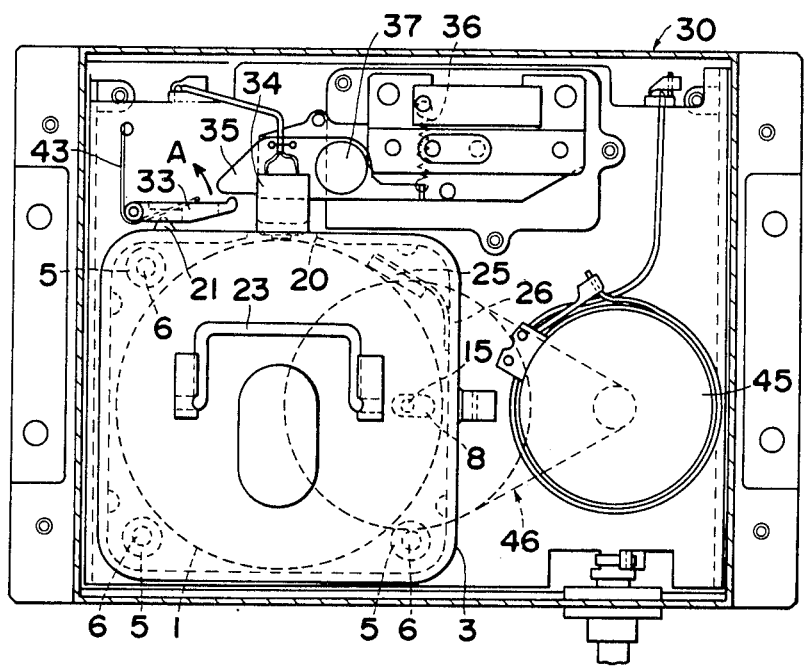
FIG. 3 is a plan view of the voice information system illustrated in FIG. 2.

FIGS 2 and 3 show the magnetic drum cassette adapted to a voice information system 30. If the cassette is adapted to the system, a set screw 31 is removed to open a closure 32, and the magnetic drum cassette according to the invention is inserted and secured in position. The cassette is positioned accurately by the aid of the engagement of the guide tubes 5 and lever 33 is pushed by the cam 21 so that the lever 33 is rotated in the direction shown by an arrow A. Thus, the lever pushes a magnetic head support 35, which will be then rotated about the axis 37 against a force of a spring 36. Therefore, the magnetic head, which will be supported at a level of a certain track of the magnetic drum, is retracted or released from the position of the cassette so that the cassette is readily inserted into position without any obstruction or difficulty.

When the cassette is pushed further for purpose of securing it into position, the other cam 22, which is formed on the outer surface of the upper casing 3, pushes the other lever 40 outwardly, and the capstan 15 moves slightly outwardly against a compression force of a spring 41 to permit the capstan 15 to be inserted into the concentric groove 13 of the magnetic drum 1.

When the cassette is fully inserted into the predetermined position in the voice information system, the engagement between the lever 33 and the cam 21 is released and these elements are retracted to their original position to permit the magnetic head 34 to contact the surface of the magnetic recorded layer 11. Also, the other lever 40 is retracted to its original position, and the capstan 15 is biased against the rubber ring 14 of the magnetic drum 1. After the parts are placed in condition for rotation as described, the closure can be adopted and secured in position by the set screw 31. The magnetic drum cassette thus inserted in the system is fully held by a leaf spring 42.

A motor 45 drives a flywheel 47 through a suitable delivery device 46 such as an endless belt to rotate the capstan 15, which drives the magnetic drums 1 at a predetermined constant speed. The magnetic head 34 is movable in the axial direction of the magnetic drum 1 for track selection purposes.

Figure 5:
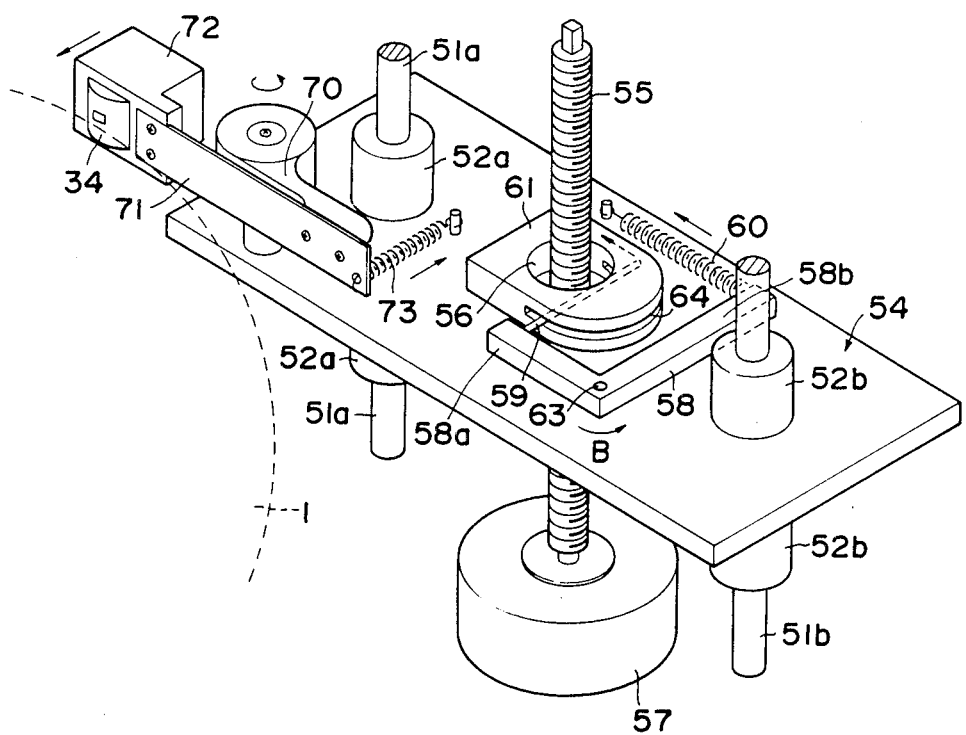
FIG. 5 is a perspective view of a magnetic head driving system applicable to the magnetic drum cassette according to the invention.

With reference to FIG. 5, a driving system for the track selection of the magnetic head will be briefly explained, the driving system being applicable to the device according to the present invention. The track selection mechanism of the magnetic head has a carriage 54 which is vertically movable along guide shafts 51a, 51b. More specifically, the planar carriage 54 has guide tubes 52a, 52b at a spaced relation as shown in FIG. 5, through which the guide shafts are inserted so that the guide tubes and carriage 54 together move along the guide shafts 51a, 51b. The driving system has a driving screw 55 for moving up and down the carriage 54 which carries the magnetic head 34.

The driving screw 55 extends through a relatively large bore 56 and is rotatably supported by a suitable supporting means (not shown). The driving screw 55 is connected to a stepping motor 57. On the carriage 54, there is provided an L-shaped needle arm 58 which is pivotable at a pivot 63, a needle 59 which is secured by the needle arm 58 and is engageable with the driving screw 55, a spring 60 for biasing the needle arm 58 about the pin 63 in the direction shown by an arrow B so that the needle 59 may be resiliently engaged with the driving screw 55, and a needle guide 61 which is connected to the carriage 54 for limiting the movement of the pin 59 in the axial direction of the driving screw 55.

Figure 6:
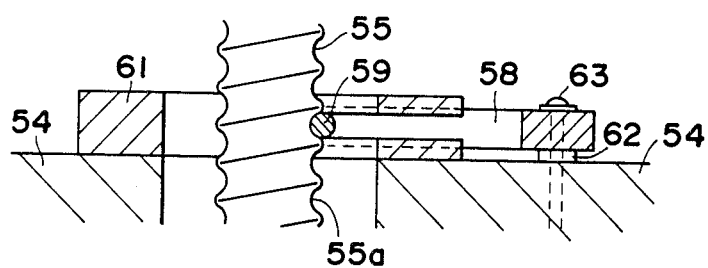
FIG. 6 is a partly sectioned view showing a principal mechanism of the driving system shown in FIG. 5.

The needle arm 58 has a relatively short arm portion 58a and a relatively long arm portion 58b connected to the former at right angles to form an L-shaped structure. The needle arm 58 is slightly spaced from the upper surface of the carriage by means of a washer 62 as shown in FIG. 6, and rotatably secured by the pivot 63 at the corner thereof. The pin 59 is connected to the short arm portion 58a so that it extends in parallel with the long arm portion 58b. The pin 59 has a diameter suitable for fitting to the root or thread groove 55a of the driving screw 55. The needle 59 is inserted into a guide groove 64 and is fitted to the thread groove 55a of the driving screw 55. Thus the pin 59 is held within the needle guide 61, and at the same time resiliently pressed against and contacted to the driving screw 55 by the effect of the spring 60 which is connected at the end of the long arm portion 58b. Accordingly, when the driving screw 55 is rotated, the needle 59 is shifted in its horizontal position to forcibly shift the position or level of the carriage 54 because the pin 59 is held within the groove 64 of the needle guide 61. Thus, the rotation of the driving screw permits movement of the carriage, and therefore, the magnetic head 34.

The magnetic head 34 is secured to the carriage 54 in a desired manner. For example, as illustrated in FIG. 5, a head holder 72 including therein the magnetic head 34 is held by a leaf spring 71 and a pivotal arm 70. More specificallly, the magnetic head holder 72 is connected to an end of the elongated leaf spring 71, the other end of which is connected to the pivotal arm 70. The pivotal arm 70 is rotatably secured to the carriage 54. The other end of the leaf spring 71 is spring biased by a helical spring 73 so that the magnetic head 34 is resiliently contacted with the magnetic drum 1, shown by phantom lines in FIG. 5. Since the needle 59 is held within the guide groove of the needle guide 61, the spring between the needle 59 and the carriage surface 54 is maintained constant. Accordingly, an undersirable backlash between the needle arm 58 and the carriage 54 can be absorbed.

The construction described above permits a reliable operation and can avoid blockage even when a run-out is produced in the driving screws 55. Since the needle 59 is urged against the driving screw 55 by means of the spring 60 without any clearance, the magnetic head can be held in accurate position relative to the selected track of the magnetic drum, without any positional error or deviation. Further the illustrated structure of supporting the magnetic head permits the magnetic head to contact reliably and resiliently the selected track of the magnetic drum.

Figure 7:
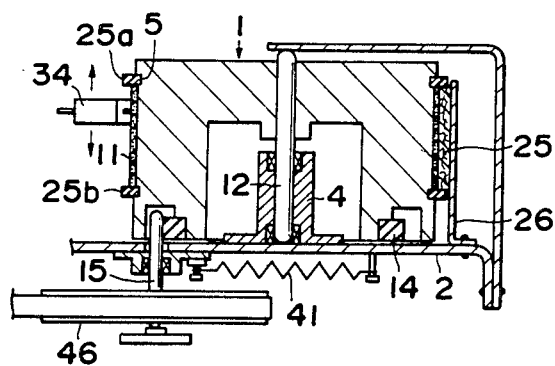
FIG. 7 is a sectional view of a modified magnetic drum according to the present invention, illustrating oil stopper rings fixed to the upper and lower portion of the magnetic drum.

FIG. 7 shows a modification of the magnetic drum shown in FIG. 1. In the modified structure, oil stopper rings 25a, 25b are fixed to the magnetic drum at its upper and lower portions where the upper and lower end of the oil-impregnated pad 25 are positioned. The oil stopper rings are firmly fitted to recesses of the magnetic drum but extended outwardly from the surface of the magnetic recorded layer 11 of the drum 1. The oil stopper rings 25a, 25b can prevent the oil, such as silicone oil impregnatedin the oil pad 25, from flowing out of the magnetic recorded layer 25 of the drum 1. The oil stopper rings are made of felts, blotting paper or any other suitable material which can absorb the oil. Other structure of the magnetic drum and its associated parts such as rubber ring 14, spring 41, driving device 46 are considered to be substantially similar to the structure of the previous embodiment, and a further detailed description will not be made.

Although the present invention has been described with reference to the preferred embodiments, many modifications and alterations may be made within the spirit of the invention.

What is claimed is:

1. A magnetic drum/head system for reproducing a recorded information, comprising a magnetic drum cassette having therein a magnetic drum driven by a capstan, a magnetic head contacting an information track on the magnetic drum for generating selected recorded information, wherein said magnetic drum cassette comprises:

a lower casing having a bearing at its central portion;

an upper casing fitted to said lower casing to form a housing for enclosing therein said magnetic drum;

an oil coating device mounted on resilient means fixed to said housing to slidably contact with the circumference of said magnetic drum;

an opening in said housing for permitting said magnetic head through said opening; and, a cover, slidably mounted on means formed on said housing, for opening and closing said opening in the housing, thereby protecting said magnetic drum when said cassette is released from said system;

wherein said cover has a cleaner plate for cleaning said magnetic head when said cover is repeatedly slid manually in and out of contact with the magnetic head.

2. The system according to claim 1, wherein said magnetic drum cassette has a friction ring on said magnetic drum, said friction ring being engaged by said capstan for driving said magnetic drum.

3. The system according to claim 2, wherein said housing has a through hole at said lower casing for receiving said capstan.

4. The system according to claim 1, wherein said system includes a carriage including means mounting said magnetic head in an abutting relationship to said magnetic drum, and a carriage driver for selectively moving said carriage relative to said magnetic drum, thereby shifting the position of said magnetic head to a selected information track of said magnetic drum, wherein said carriage driver comprises:

a driving screw extended through said carriage;

a needle resiliently engaged with said driving screw; and, a guide means, connected to said carriage, for limiting the movement of said needle and forcibly shifting the position of said carriage via said needle when said driving screw is rotated.

5. The system according to claim 4, wherein said magnetic head is supported by a leaf spring horizontally and pivotally mounted on said carriage, thereby resiliently pressing said magnetic head against said magnetic drum.

* * * * *